United States Patent
Acknin et al.

[19]

[11] Patent Number: 5,962,052
[45] Date of Patent: Oct. 5, 1999

[54] METHOD FOR PREPARING SAVORY OR SWEET FOODS SUCH AS PIZZAS, PIES AND THE LIKE FROM BAKED PASTRY AND A SAUCE, A TOPPING AND/OR CONDIMENTS

[75] Inventors: Christian Acknin, Terssac; Philippe Raymond, Albi, both of France

[73] Assignee: Societe Civile B.A.R.H., Albi, France

[21] Appl. No.: 08/945,227

[22] PCT Filed: Apr. 9, 1996

[86] PCT No.: PCT/FR96/00532

§ 371 Date: Dec. 4, 1997

§ 102(e) Date: Dec. 4, 1997

[87] PCT Pub. No.: WO96/32018

PCT Pub. Date: Oct. 17, 1996

[30] Foreign Application Priority Data

Apr. 12, 1995 [FR] France ................................... 95 04498

[51] Int. Cl.⁶ .............................. A21D 10/02; A23B 55/00
[52] U.S. Cl. .......................... 426/112; 426/120; 426/128; 426/394
[58] Field of Search ..................... 426/112, 120, 426/394, 128, 410

[56] References Cited

U.S. PATENT DOCUMENTS

| | | | |
|---|---|---|---|
| 2,772,171 | 11/1956 | Montminy . | |
| 2,899,318 | 8/1959 | Long | 426/120 |
| 2,970,920 | 2/1961 | Forkner | 426/120 |
| 3,743,520 | 7/1973 | Croner | 426/120 |
| 3,809,224 | 5/1974 | Greenwood | 206/219 |
| 4,100,308 | 7/1978 | Gawrilow | 426/554 |
| 4,994,056 | 2/1991 | Ikeda | 604/410 |

FOREIGN PATENT DOCUMENTS

| | | |
|---|---|---|
| 0502327 | 2/1992 | European Pat. Off. . |
| 2649772 | 5/1978 | Germany . |
| 796499 | 6/1958 | United Kingdom . |
| WO8703784 | 2/1987 | WIPO . |

*Primary Examiner*—Anthony J. Weier
*Attorney, Agent, or Firm*—Harrison & Egbert

[57] ABSTRACT

A method for preparing savory or sweet foods such as pizzas, pies and the like from baked pastry and a sauce and/or a topping and/or condiments in which a basic dry or powdered liquid or wet ingredients are kept apart until the time of preparation. A condiment packaging is provided that includes storage compartments for the dry and/or powdered and liquid or wet condiments. The compartments are separate and communicate with one another to enable the ingredients to be mixed together and kneaded. The compartments may be opened to spread out the resulting substances by mixing.

13 Claims, 10 Drawing Sheets

FIG. 15 ically, taste and dietary qualities and ensuring
sanitary preservation of the products prior to their use.

In addition, the process of the present invention aims at reproducing basic culinary steps at an accelerated rate, whenever desired, rapidly, precisely and without failing.

The invention also aims at a process and packaging which allows for a sequential making of the dough by mixing the ingredients in the packaging itself, spreading it then onto a baking unit, then spreading the sauce and/or garnish which may be liquid, as is the case with tomato sauce, pasty as is the case for cheese for instance, or composed of pieces, as is the case of ham or anchovies for instance, and this from the same packaging of from several packagings of the same design with several chambers containing ingredients which should not be mixed prior to the time of fabrication in the proper sequence.

For this purpose, the fabrication process under the invention for salty or sweet dishes using baking dough and sauce and/or garnish and/or condiments, such as pizzas, pies or other dishes whose basic dry and/or powdery and/or wet ingredients must not come into contact with each other prior to preparation, is characterized mainly in that it uses for a dish a single packaging for the condiments which has separate storage enclosures for the dry and/or powdery and/or wet, liquid or pasty condiments. The enclosures are being hermetically separated but able to communicate between each other to mix the ingredients and knead them and to be opened to allow for the sequential spreading of the items.

According to another feature of the process under the invention, after mixing, stirring and kneading of the dry and wet ingredients, the dough thus produced is poured onto a baking unit and at least one garnishing item is extracted from at least one enclosure and poured onto the dough.

The packaging used to implement the aforementioned process is characterized mainly in that it includes at least one hermetic and sealed enclosure, divided into no less than two hermetic and sealed compartments, one of which contains the dry and powdery ingredients such as the flour and the other contains the liquid. The enclosure division can be reversed with a removable system permitting hermetic and tight separation or communication of two parts in order to mix and knead or stir the ingredients so as to produce a dough which will be spread by opening the enclosure onto a baking unit.

According to another characteristic of the invention, the packaging has a rigid or semi-rigid plate, with one face containing the enclosures separated by a soft wall. The plate is provided with perforations opposite the enclosures and under the plate. A peelable soft wall is arranged such that the removal of the soft wall causes the perforations to open and the ingredients to be distributed.

Other advantages and characteristics of the invention will become apparent when reading the description below of an embodiment of the invention given as a non limiting example, and illustrated in the attached drawings.

BRIEF DESCRIPTION OF THE DRAWINGS

METHOD FOR PREPARING SAVORY OR SWEET FOODS SUCH AS PIZZAS, PIES AND THE LIKE FROM BAKED PASTRY AND A SAUCE, A TOPPING AND/OR CONDIMENTS

This application is the 35 USC 371 national stage application PCT/FR96/00532 filed Apr. 9, 1996.

TECHNICAL FIELD

The purpose of this invention is a fabrication process for salty or sweet dishes using baking dough and sauce and condiments, such as pizzas or pies.

BACKGROUND ART

The traditional process, which is for the most part a manual one, consists of preparing the dough using a powdery mixture of flour and liquid such as water, rolling it out, garnishing it and baking it in an oven.

The traditional process rationalization in most cases calls for advance preparations, which reduces preparation duration at the time the order is placed.

Known techniques associated with freezing move the preparation times to the most propitious time.

The result, using known methods, is often achieved to the detriment of the sanitary, dietary and taste qualities, due to cold chain breakdown on the one hand and on the other to the pre-storage of the ready-to-use ingredients, components, dough, sauce, garnishes and condiments.

The purpose of this invention is a fabrication process which provides through mechanical means an appropriate packaging for storing the dry and powdery ingredients, such as flour based mixtures, liquids, such as water to make dough, the sauce and/or the garnish and condiments in such a way that they come into contact with each other only either when they need to be mixed in the case of powders and liquids used to make the dough, or when they are spread onto the dough in the case of the sauce and/or the garnish.

Multi-compartmented packaging for products which need to be mixed only at the time they are used is known of.

U.S. Pat. No. 4,994,056 (IKEDA) describes such a packaging for pharmaceutical substances, which consists of a soft pouch with two compartments separated through a pinching system which is designed to make them communicate to mix the products and obtain the medicine to be used.

Patent WO 8703784 (MEDEN-TEAM Aktimgesellschaft) describes a packaging used in breadmaking.

According to this prior art patent, a first soft pouch contains the flour based mixture and includes a second pouch containing the liquid which is discharged into the first pouch through pressure when it is time to mix the ingredients.

This patent and the packaging it describes are limited to the making of only the powdery and water mixture in order to make bread.

The problem of a potential pasty, wet or liquid garnish, such as a sauce or cheese or cream, is not considered by this patent and cannot be solved by adding to the first pouch another pouch, containing sauce for example. In this patent, the dough pouch is opened in an enclosed dough baking chamber, which excludes the possibility of a third pouch containing sauce for example and/or garnish which can stay on standby while the dough is being made and/or baked.

SUMMARY OF THE INVENTION

The process of the present invention aims at the execution of culinary preparations in a very short time while main

FIG. 4 shows a cross sectional view in accordance with FIG. 3a;

FIG. 11a shows the dosing unit in accordance with FIG. 10;

FIG. 11b shows a slit rotating shaft used in the embodiment of FIGS. 10 and 12;

FIG. 12 is a cross-sectional view of the dosing unit in accordance with FIGS. 10 and 11a;

DETAILED DESCRIPTION OF THE PRESENT INVENTION

The process of the present invention aims at the fabrication of salty or sweet dishes such as pizzas or pies. These dishes are made using baking dough and sauces and/or garnishes such as anchovies, ham or others, whose dry and/or powdery and/or wet ingredients must not come into contact with each other until preparation time. The dry and/or powdery ingredients include a flour mixture ready for use with all dry additives needed for dough preparation pre-added into the mixture.

The wet ingredients are the water to be mixed with the dry ingredients (flour) and sauces such as tomato sauce, needed for the preparation of pizza.

According to the process under the invention, a single packaging is used to make a dish or several packagings are used, one of which contains the ingredients to make the dough and the other one or more sauces and garnishes. This packaging contains the ingredients mentioned above in various storage enclosures which are hermetically separated and which can be made to communicate between each other in order to allow the sequential distribution of products.

According to the process under the invention, after mixing, stirring and kneading the dry and wet ingredients, the dough obtained is poured onto a baking unit and at least one garnish is extracted from at least one enclosure which is a part of the packaging, to be spread onto the dough thus produced.

FIGS. 1a–1d are a schematic representation of the process under the invention.

Figure 1A:
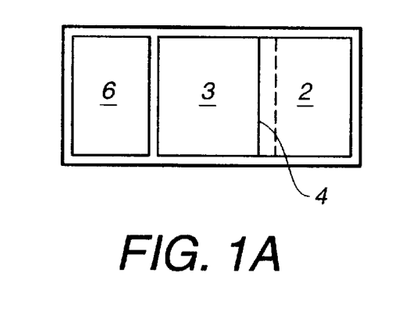
FIGS. 1a through 1e are a schematic representation of the process according to the invention.

According to the invention, a packaging or dosing unit 1 is used which includes one synthetic soft pouch which is described in greater detail hereafter. Dosing unit 1 includes at least two enclosures 2, 3. Enclosures 2 and 3, as illustrated in FIG. 1a, are separated in 4 by means of a sealed but reversible separation which allows enclosures 2 and 3 to communicate with each other.

One advantage is that one of the enclosures, for instance the one referred to as 2, contains the dry and powdery ingredients, i.e. the flour mixture and enclosure 3 contains the wet products, i.e. the water to be mixed with the flour to make the dough.

Figure 1B:
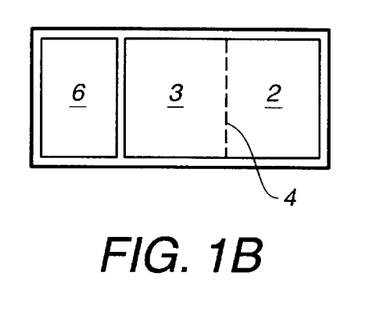

In FIG. 1b separation 4 is opened, which makes enclosures 2 and 3 communicate with each other.

Figure 1C:
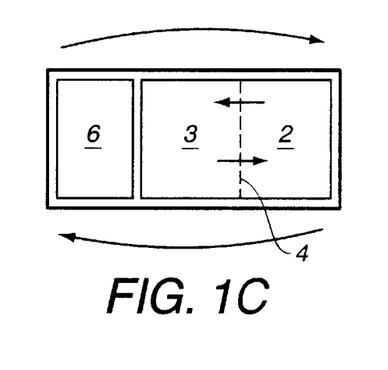

FIG. 1c uses arrows to show schematically the mixing and stirring which allows the dough to be formed and kneaded by any means with the stirring of dosing unit 1 as one of the potential means to be used.

Figure 1D:
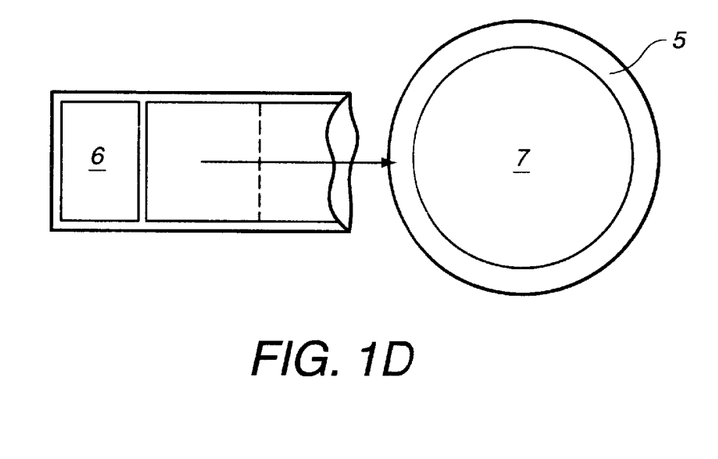

FIG. 1d shows the opening of the dosing unit by one end and the pouring of the dough produced onto a heating plate 5 for baking.

Figure 1E:
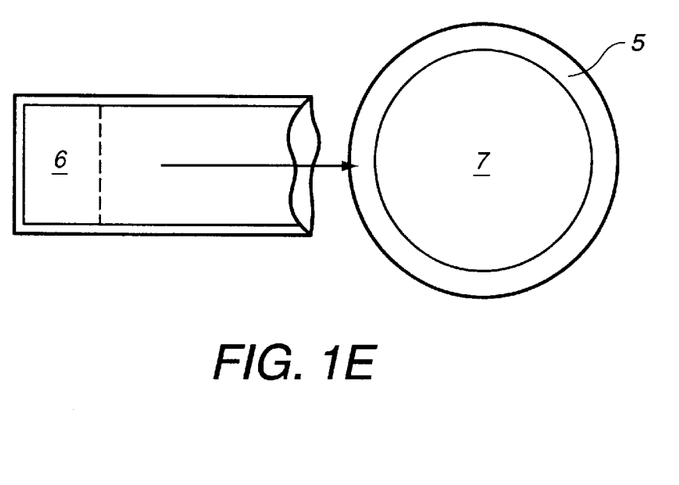
Figure 2A:
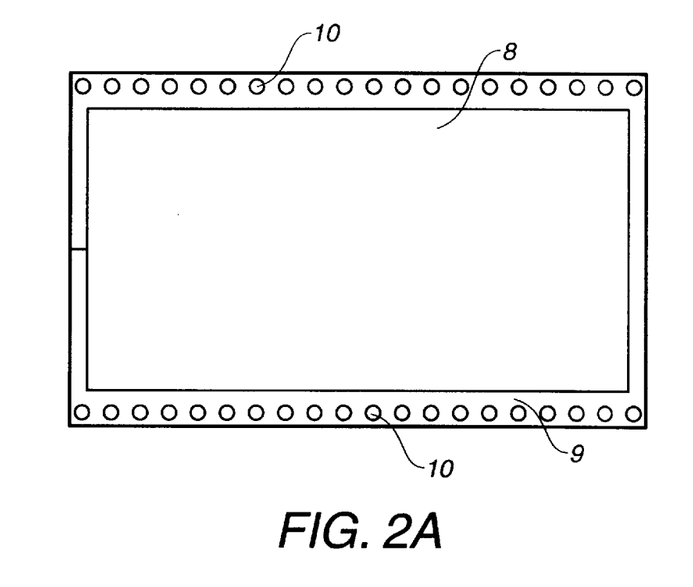
FIG. 2a shows a top view of a dosing unit implemented using the invention process.
Figure 2B:
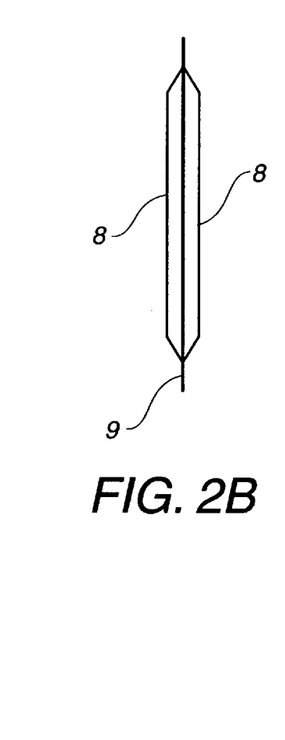
FIG. 2b shows a cross-sectional view of the dosing unit.
Figure 2C:
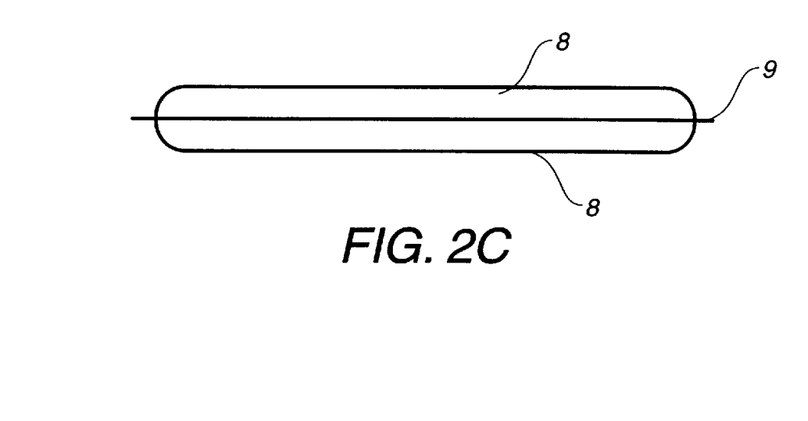
FIG. 2c shows another side view of the dosing unit.

FIG. 1e is a schematic representation of the opening of an additional enclosure 6 to the dosing unit, containing for instance a sauce to be spread onto the dough after or during baking. The dosing unit is shown in FIGS. 2a–2c and in the following figures; as represented, the dosing unit is composed of a bag with double thickness or sheets 8 of rectangular shape welded on their edges onto a more rigid frame 9. Sheets 8 are made of food service quality synthetic material.

Frame 9 is made of a more rigid material.

The longitudinal edges of the frame are equipped with means allowing for manual or mechanical handling of the dosing unit.

In the embodiment example shown, the means for manual or mechanical handling has lines of perforations 10 along each longitudinal side of the frame which can engage with a geared wheel of the corresponding handling device.

The dosing unit internal volume is designed to house the volume of ingredients required to produce a single dish, such as a pizza.

An advantage of the invention is that two packagings 1 are used in the process of the present invention, one for the powdery and liquid mixture used to make the dough, the other for the sauce(s) and garnishes.

Figure 3A:
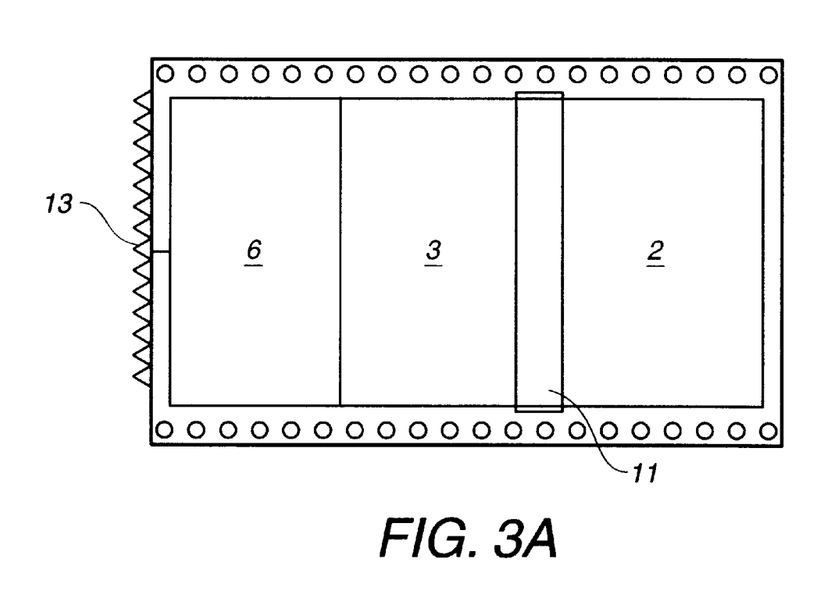
FIG. 3a represents a top view of a dosing unit.
Figure 3B:
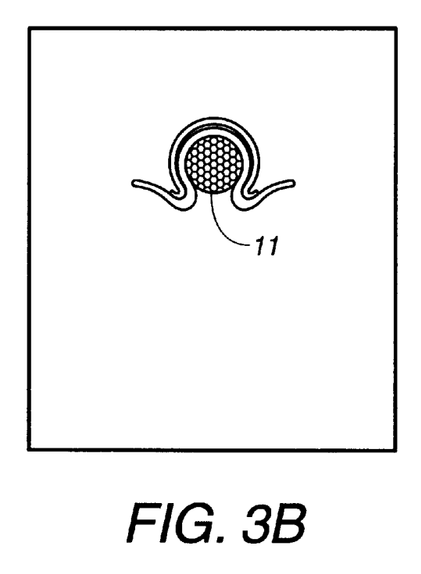
- FIG. 3b shows a close-up cross-sectional view of element 11.
Figure 4:
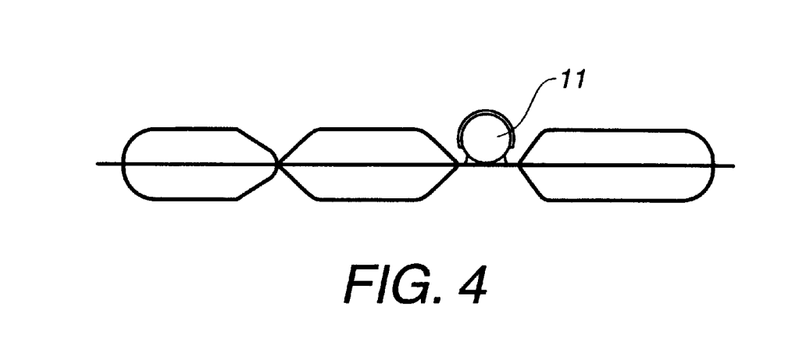

FIGS. 3a and 4 show a top view and cross-sectional view of the dosing unit according to the invention, with a separate detail view of tong 11 in FIG. 3b.

In this embodiment example, the dosing unit includes at least two enclosures 2 and 3 containing the dry and/or powdery ingredients such as the flour and the wet products and an enclosure 6 containing another ingredient which may be a sauce.

Enclosures 2 and 3 are divided in 4 by a hermetic separation system which has an articulated or ratchet tong 11, each branch of which covers one face of the dosing unit.

Figure 7:
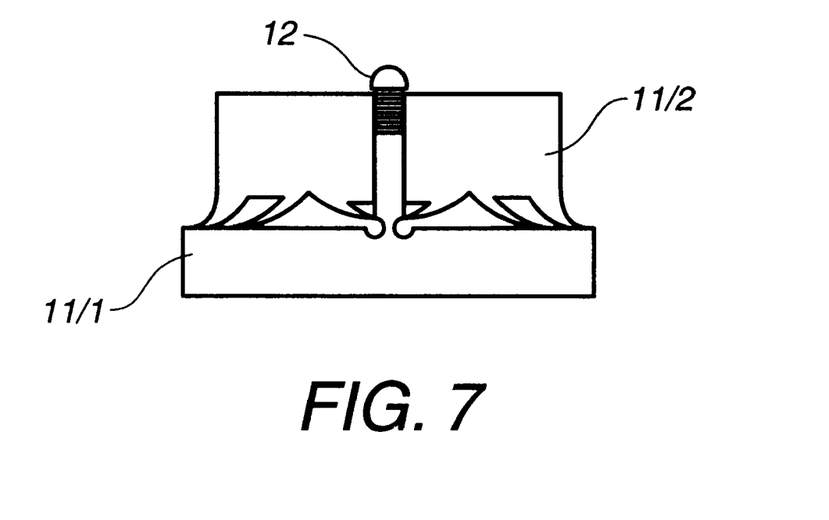
FIGS. 7 and 8 show dosing unit tongs in accordance with the preceding figures.
Figure 8:
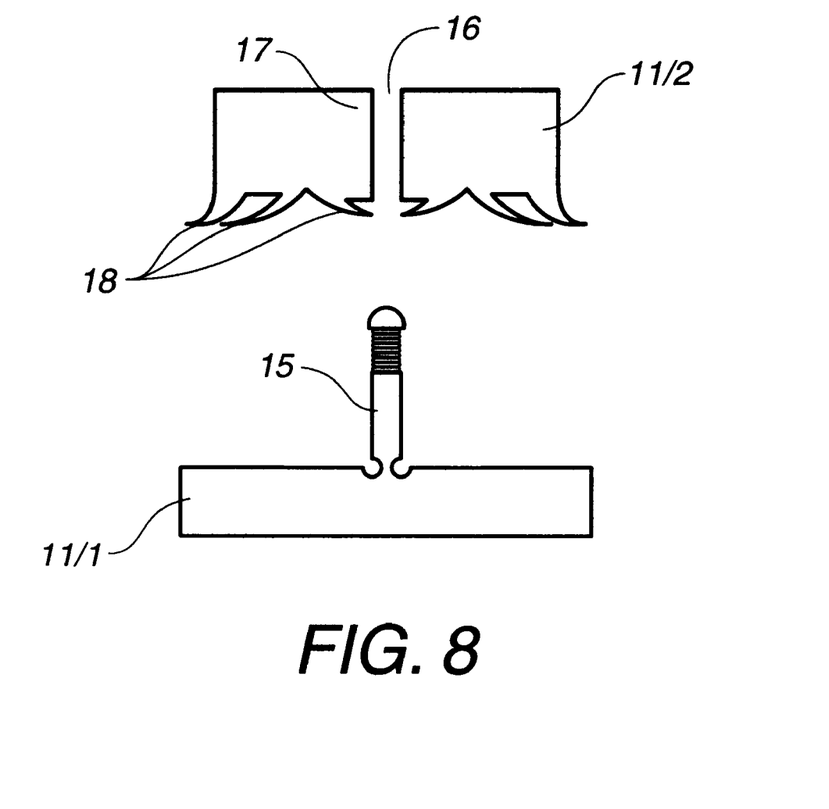

The tong is shown in greater detail in FIGS. 7 and 8. As shown and explained later, one of the tong branches shows pins 12 with locking means which penetrate into the corresponding holes of the tong's other branch. On the back side of the dosing unit, located along side enclosure 6, frame 9 shows a set of comb teeth 13 which can be used to spread the sauce contained in enclosure 6.

Figure 5:
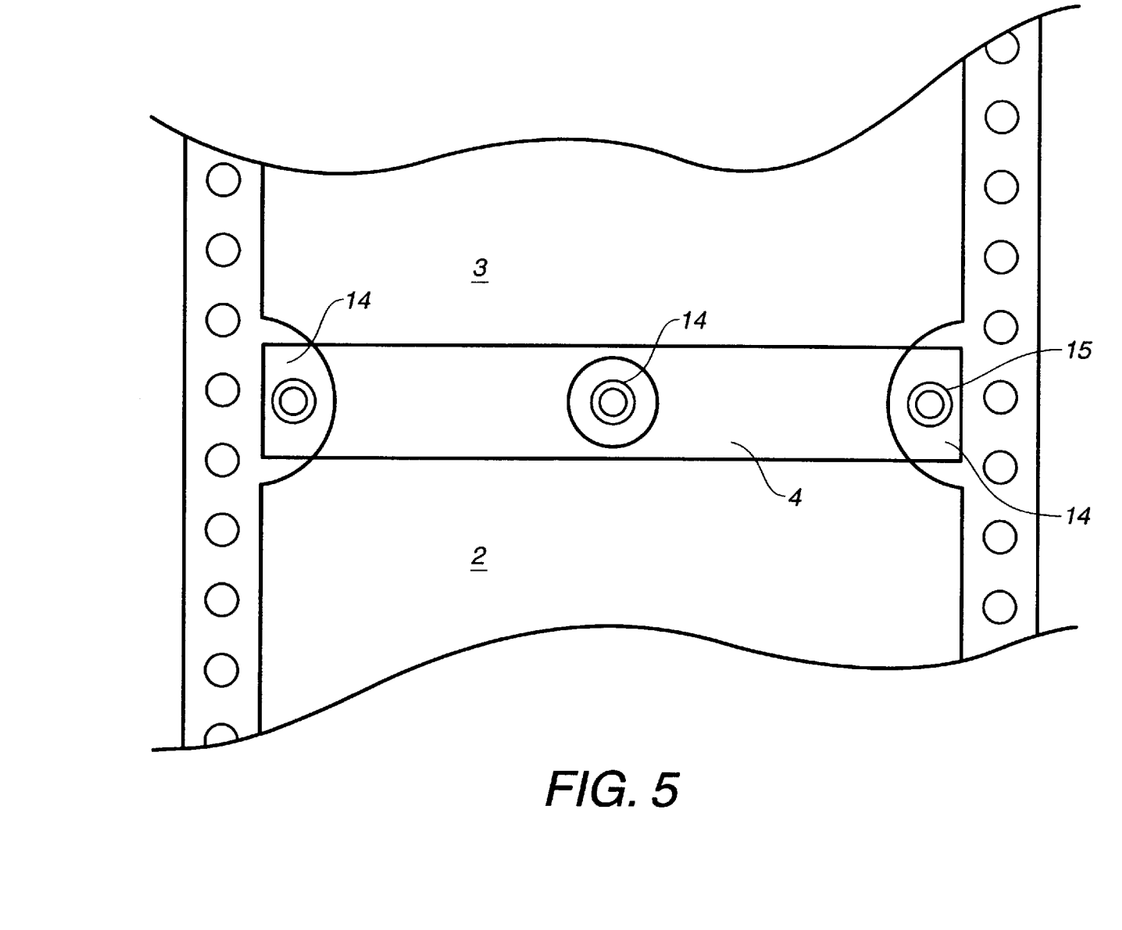
FIG. 5 shows a partial view of the dosing unit at the separation, 4, of enclosures 2 and 3 with the use of holes and pins of tongs.
Figure 6:
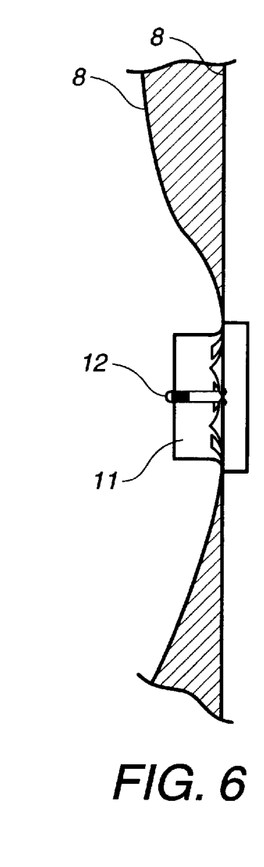
FIG. 6 is a cross-sectional view in accordance with FIG. 5.

FIGS. 5 and 6 show a partial top view (FIG. 5) and cross-sectional view of the dosing unit at the separation in 4 of enclosures 2 and 3.

Sheets 8 making up the dosing unit show at that level cylindrically or elliptically shaped weld areas 14 into which holes 15 are made for pins 12 of tongs 11. These welded areas offer the advantage of a reduced communicating surface area between enclosures 2 and 3 when tong 4 is removed, which, whenever the products flow from one enclosure into the other and vice-versa, creates a throttling effect that mixes the products together.

FIGS. 7 and 8 show a cross-sectional view of tong 11. One of its branches 11/1 shows vertical pins 12 turned toward the inside or the other branch (only one of which is shown). The pins are provided with ring grooves 15. The other branch 11/2 has holes 16 (only one of which is shown).

The upper lip of each hole has at least one flanging ring rib 17 which, when locking the branches one on the other and pins 12 into holes 16, locks into a corresponding groove 15.

Advantageously, the internal face of branch 11/2 of the tong which comes in contact with sheet 8 of the dosing unit is equipped with longitudinal lips 18 which collapse between the tong branches.

At the time dosing unit 1 is fabricated, and prior to filling enclosures 2 and 3, tong 11 may be put into place by any appropriate means providing sufficient clamping force to ensure the tightness and sealing of the separation between the two enclosures.

Removal of the tong at the time the ingredients are to be mixed, may be done using automated or nonautomated mechanical means.

Figure 9:
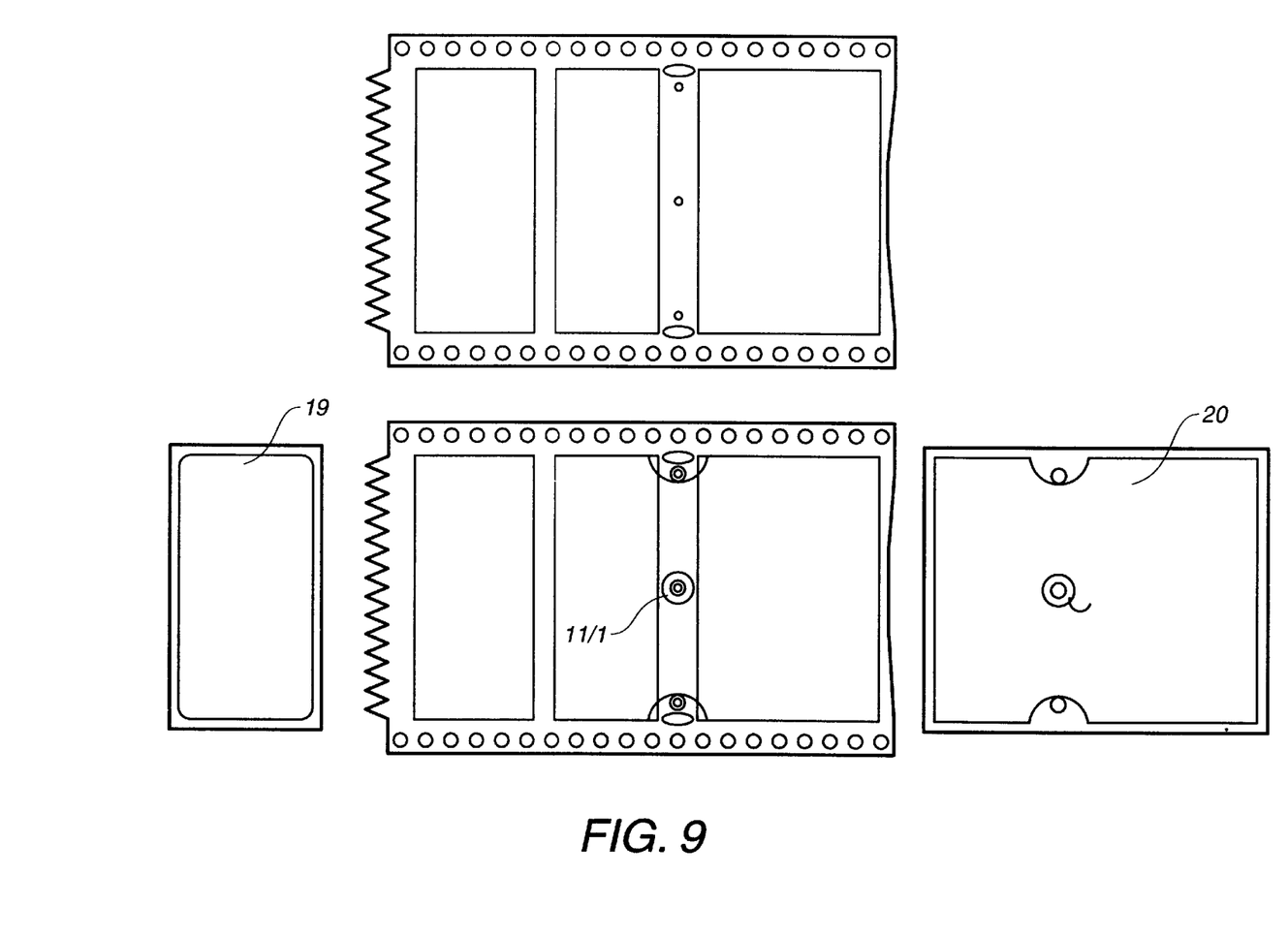
FIG. 9 is a top view of a dosing unit production system

FIG. 9 shows another embodiment of the dosing unit under the invention in which a sauce bag 19 and a dough bag 20 are placed in the corresponding dosing unit enclosures. Implementation is done after mixing, stirring and kneading the dough by opening reunited enclosures 2 and 3 with any known means, then pouring the liquid dough onto the heating plate, and then opening enclosure 6 and pouring the sauce.

As is the case with enclosures 2 and 3, enclosure 6 can be opened by any known means, for instance by slicing with a knife or removing one glued or welded cap on a drain opening for liquid or semi-liquid products.

The opening may also be achieved by separating superimposed sheets 8 making up the dosing unit at least one of which may be entrained on a rotating cored axle, transverse to its longitudinal axis.

Mixing, stirring and kneading the products contained in enclosures 2 and 3 of the dosing unit may be done by pressing or alternating back and forth movement of a roller.

Figure 10:
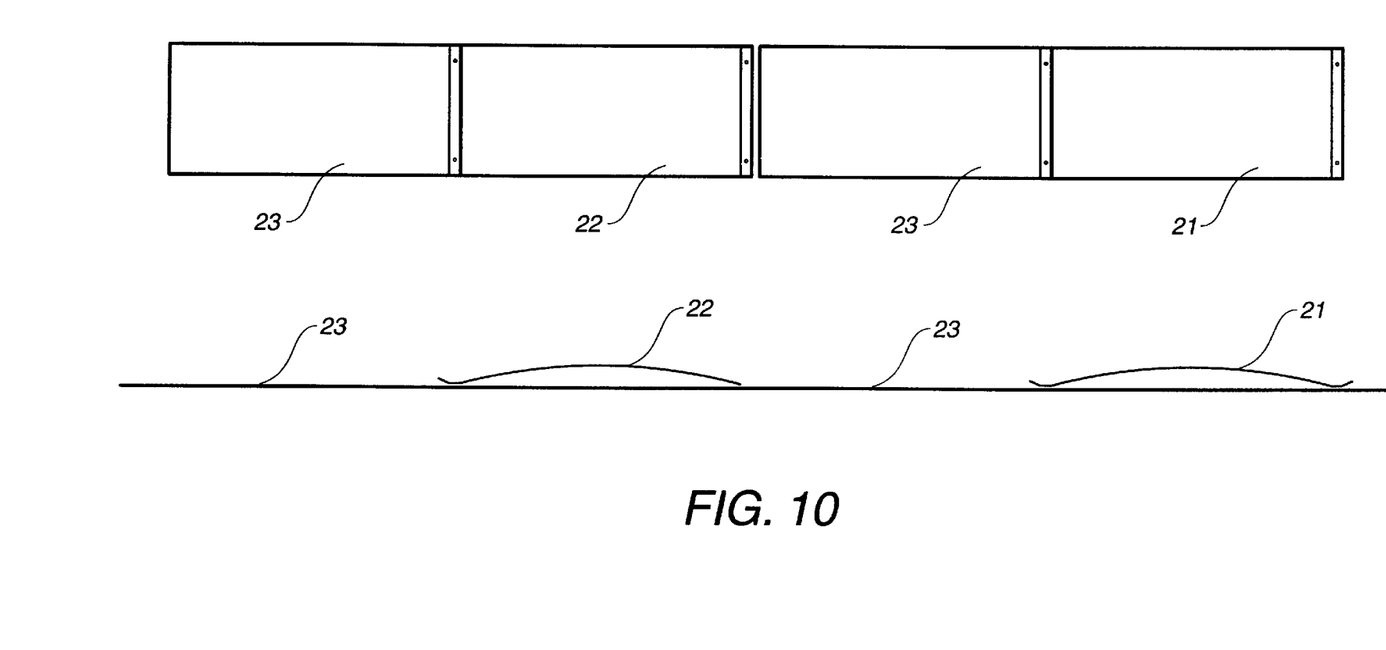
FIG. 10 is a top view of another type of dosing unit to implement the process under the invention.
Figures 11A, 11B, 12:
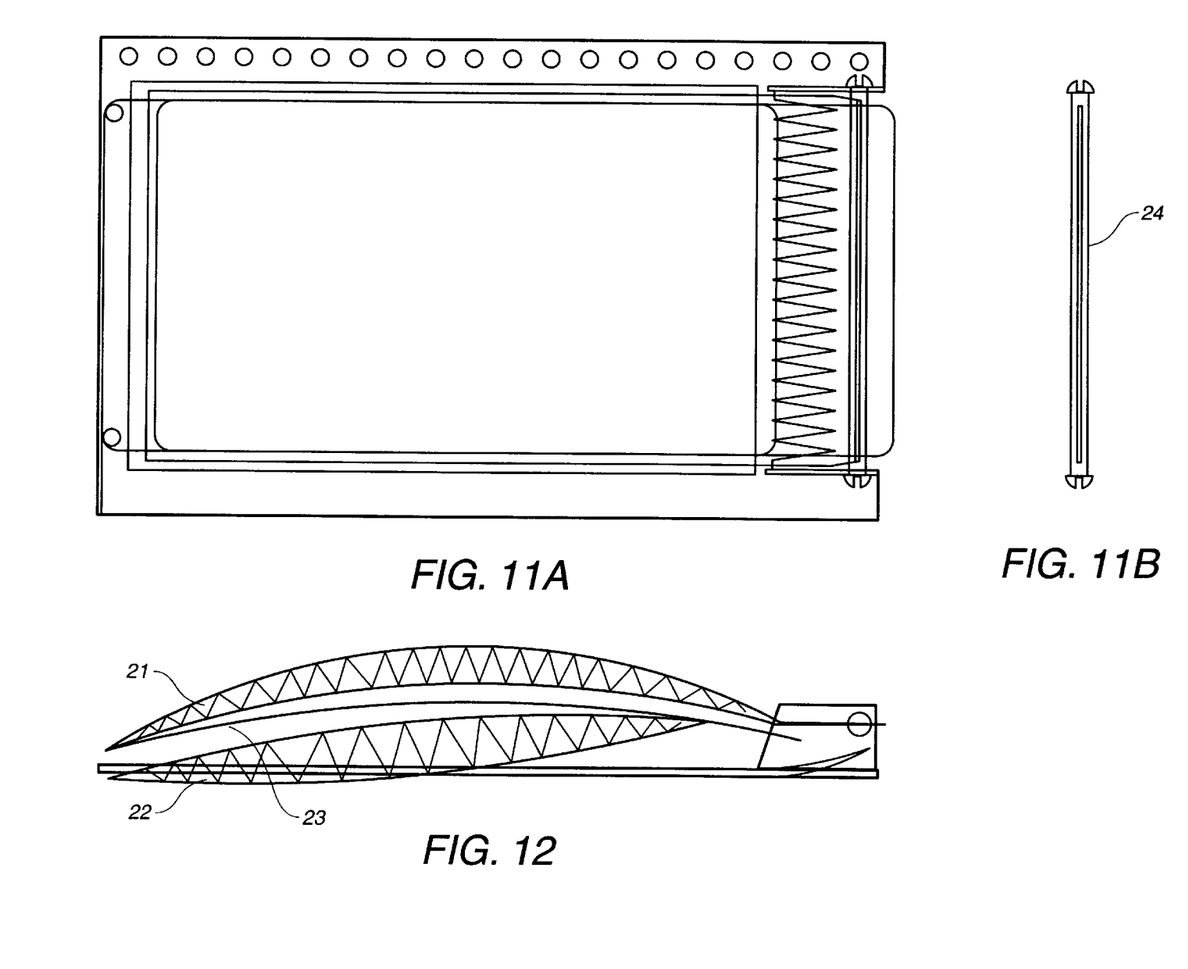

FIGS. 10, 11 and 12 show another embodiment of the dosing unit.

According to this embodiment, the dosing unit is made of two soft rectangular shaped enclosures referred to as 21 and 22. Both enclosures 21 and 22 are linked to each other by strip 23, the length of which is equal to that of each enclosure and the width of which is equal to each of the enclosures (FIG. 10).

Figure 13A:
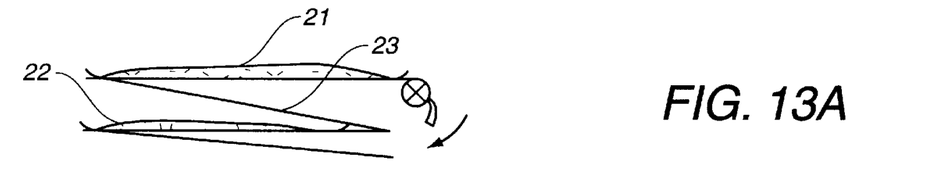
FIGS. 13a–13g show several steps in the use of the dosing unit according to FIGS. 10, 11a and 12.
Figure 13B:
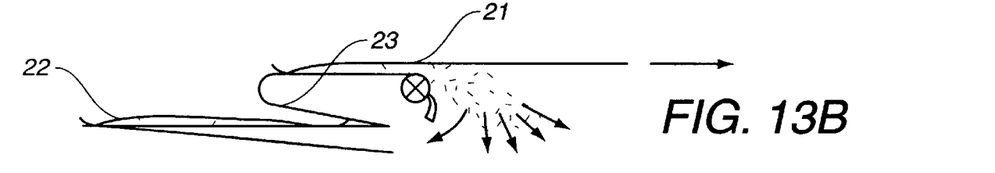

As shown in FIG. 12, the enclosures and the divider strip are folded one onto the other. This type of dosing unit works with a slit rotating shaft 24 or any similar system which, as shown in FIGS. 13a and 13c, first winds the lower layer of the first enclosure by separating it from the upper layer, which opens the enclosure and pours the ingredients it contains.

Figure 13C:
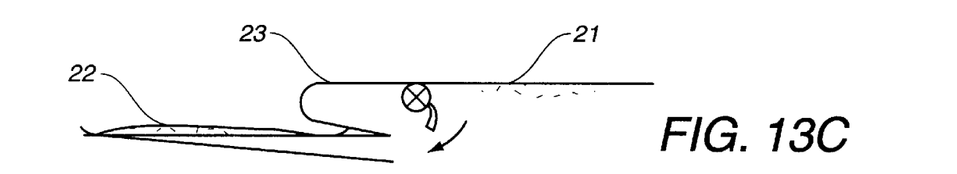
Figure 13D:
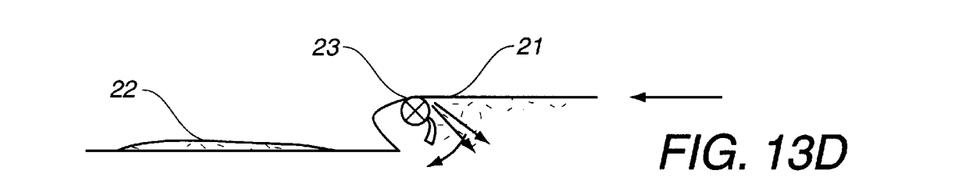
Figure 13E:
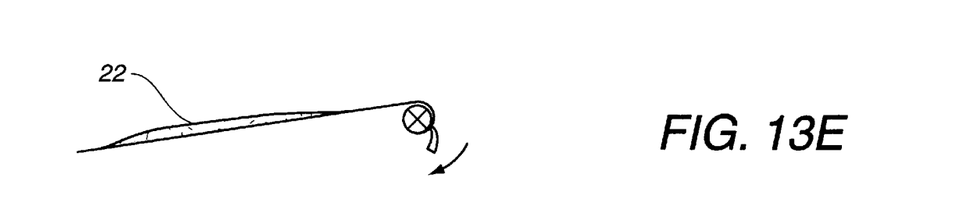
Figure 13F:
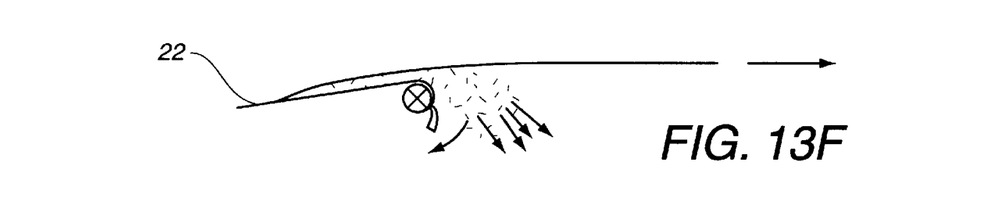
Figure 13G:
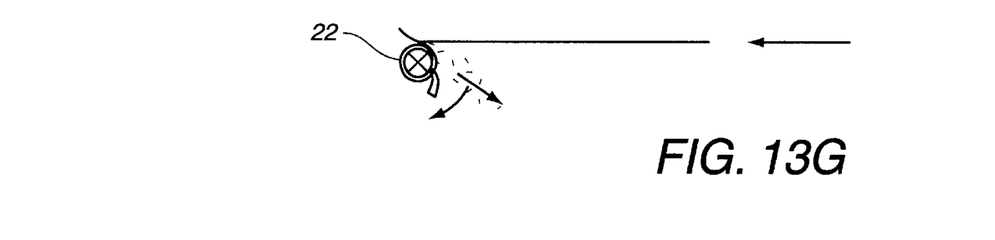

Then, according to FIG. 13c, the axle winds the divider sheet 23 and pulls enclosure 22 which then is wound as it opens like the previous one through separation of its two sheets.

The advantage is that the dosing unit at the first enclosure 21 is equipped with means such as tabs permitting to wind one of its faces onto the axle and to separate the faces from each other.

The advantage is that the slit or keyed axle turns in the trigonometric direction.

Figure 14:
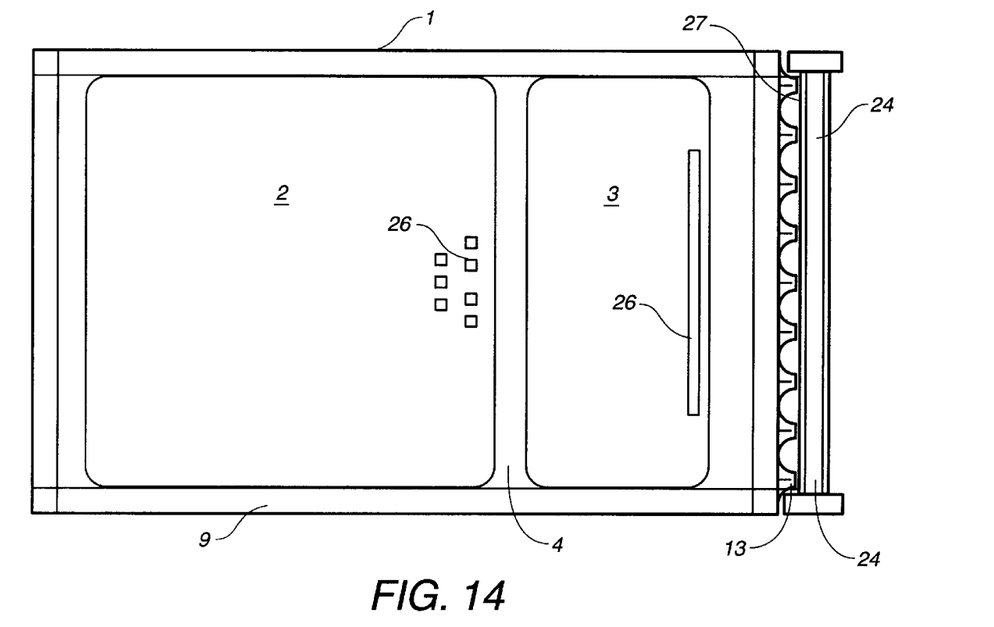
FIGS. 14 and 15 show a top view and a cross-sectional view of another type of dosing unit.
Figure 15:
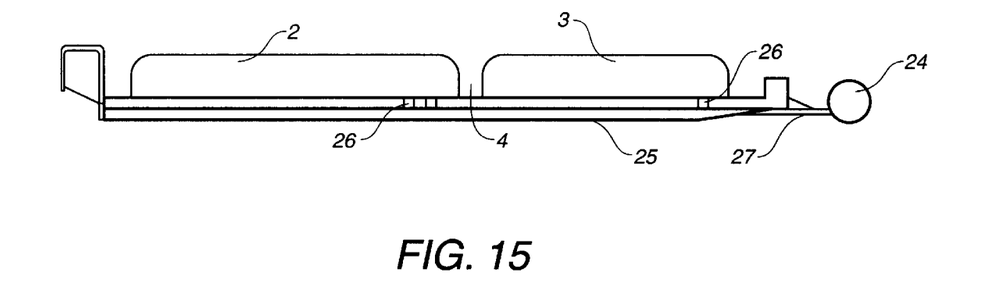

According to the invention embodiment represented in FIGS. 14 and 15, each dosing unit is composed of a preferably rectangular rigid or semi-rigid plate 25. The plate is provided with holes and/or slits 26 made at the various enclosure locations.

On one of the plate faces, a preferably thermoformed welded sheet creates separate enclosures.

Weld 4 between enclosures 2 and 3 can be peeled back to allow them to communicate.

On the other lower face of the plate, a peelable sheet 27 which plugs the openings or slits 26 is attached through welding on its edges and facing the slits or holes. This sheet is attached to the rotating axle 24 constituting a key transverse to the plate.

By turning key 24, sheet 26 is pulled off to open the enclosures and allow the products to be poured.

We claim:

1. A fabrication process for dishes using baking dough made up of a mixing of dry and powdery products and liquid products and sauce or condiment products, the process comprising the steps of:

forming a dosing unit having enclosures separated from each other, one of the enclosures containing the dry and powdery products, another of the enclosures receiving the liquid products, another of the enclosures receiving the sauce or condiment products;

contracting the dry and powdery products from said one of the enclosures with the liquid products from said another of the enclosures so as to form a dough mixture;

pouring said dough mixture onto a baking unit;

opening said another of the enclosures containing the sauce or condiment products; and spreading the sauce or condiment products from the opened enclosure onto the poured dough mixture.

2. The process of claim 1, said step of forming a dosing unit comprising the steps of:

forming a first dosing unit having a first enclosure containing the dry and powdery products and a second enclosure containing the liquid products; and forming a second dosing unit having a first enclosure for the sauce or condiment products and a second enclosure containing a garnish product.

3. The process of claim 1, said dosing unit formed of a first sheet and a second sheet, said step of opening comprising:

winding one of the sheets onto a rotating axle.

4. The process of claim 1, said step of opening comprising:

removing a cap adhered onto a drain hole formed on said another of the enclosures.

5. A packaging used in a fabrication process for making dishes which use baking dough formed by the mixture of dry and powdery products and liquid products and sauce or condiment product, the packaging comprising:

a rigid frame;

a bag formed with double sheets, said bag having edges welded onto said rigid frame, said bag having a plurality of enclosures containing respectively the dry and powdery products and the liquid products and the sauce or condiment products, each of said plurality of enclosures being separated from an adjacent enclosure by a welding together of said double sheets, and welding being separable so as to mix the dry and powdery products from one enclosure with the liquid products from the adjacent enclosure, said welding being inseparable between the enclosure for the sauce or condiment products and the enclosures for the dry and powdery products and the liquid products.

6. The packaging of claim 5, further comprising:

a transverse tong positioned onto said bag so as to separate adjacent enclosures.

7. The packaging of claim 6, said tong having a first branch with a pin extending therefrom and a second branch having a hole formed therein, said pin of said first branch engageable with said hole from said second branch, said pin extendable through a hole formed in said bag.

8. The packaging of claim 7, said hole being formed in said welding.

9. The packaging of claim 5, further comprising:

a spreading means connected to said bag for spreading the sauce or condiment products from the enclosure onto the baking dough formed by the mixture of the dry and powdery products from one enclosure with the liquid products from another enclosure.

10. The packaging of claim 5, at least two of the enclosures being united by an intermediate sheet having a same length as at last one of the enclosures.

11. The packaging of claim 10, said intermediate sheet being folded onto said two of the enclosures such that an opening of one enclosure causes an opening of another enclosure when winding the double sheets onto a rotating slit axle.

12. The packaging of claim 5, further comprising:

a plate of rigid or semi-rigid material having perforations formed thereon, said plate affixed to at least one of the enclosures; and peelable sheet affixed over an opposite side of said plate from the enclosure, said peelable sheet plugging the perforations of said plate.

13. The packaging of claim 12, said peelable sheet being affixed to a rotatable axle.

* * * * *